Dec. 20, 1960 H. OELZE ET AL 2,964,889
PROCESS FOR THE AFTERTREATMENT OF A RIGID DEEP-DRAWN CAN
FORMED FROM SYNTHETIC THERMOPLASTIC MATERIAL
AND FILLED WITH A STERILIZABLE PRODUCT
Filed July 29, 1958
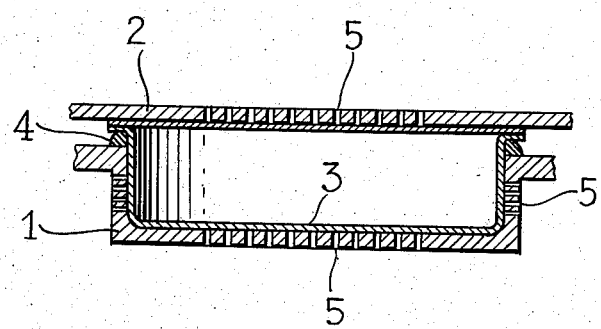
INVENTORS
HEINZ OELZE
WILLI NEITZERT
BY *Connolly and Hutz*
their ATTORNEYS … # 2,964,889
Patented Dec. 20, 1960

2,964,889

PROCESS FOR THE AFTERTREATMENT OF A RIGID DEEP-DRAWN CAN FORMED FROM SYNTHETIC THERMOPLASTIC MATERIAL AND FILLED WITH A STERILIZABLE PRODUCT

Heinz Oelze, Wiesbaden, and Willi Neitzert, Burgkirchen, Upper Bavaria, Germany, assignors to Farbwerke Hoechst Aktiengesellschaft vormals Meister Lucius & Bruning, Frankfurt am Main, Germany, a corporation of Germany Filed July 29, 1958, Ser. No. 751,780

Claims priority, application Germany Aug. 3, 1957

9 Claims. (Cl. 53—25)

The present invention relates to a process for the aftertreatment of rigid deep-drawn cans formed of thermoplastic material.

It is known that shaped articles, especially containers, for packaging solid or liquid consumer goods can be made from sheets of synthetic plastics by deep drawing. These shaped articles have, however, the disadvantage that they undergo deformation under the action of heat and thus lose the shape imparted to them by the deep drawing process. It is known that when the shaping is carried out in the range of elesticity it is reversible when the material is reheated. The position would be different if the shaping were carried out in the range of plasticity, but this has not yet been possible owing to the tendency of the sheet material to decompose.

The phenomenon of change in shape, which is due to the stresses forming in the synthetic plastic during the drawing process is of no consequence if the shaped articles are to be packed with goods at substantially room temperature or a temperature slightly above room temperature. However, change in shape is undesirably noticeable if the goods have to be packed at a raised temperature in order to make them flow or to sterilize them by the action of heat. Since packaging containers produced by deep drawing become unsightly due to the deformation at high packing temperatures, they have seldom, if at all, been used for packing footstuffs or other goods requiring elevated packing temperatures.

According to a process not belonging to the prior art, the aforesaid disadvantage is overcome by subjecting the shaped articles that have been made by deep drawing from sheets of synthetic thermoplastic material such as polyvinyl chloride or copolymers, for example, copolymers of vinyl chloride and other monomers such as vinyl acetate, vinyl propionate, vinyl butyrate and methacrylic acid methyl ester, after the deep drawing operation to a heat treatment carried out for 3 to 30 seconds, preferably 3 to 15 seconds under tension at a temperature which is 2 to 25° C. above the flow point of the synthetic plastic. Hard polyvinyl chloride sheets according to DIN specification No. 53371 printed in "Kunststoffe", 1954, page 210, for example, are treated at a temperature within the range of about 175 to 200° C. By heating to a temperature above the flow point, that is to say, in the range of plastic deformation, any tension already present in the material is removed.

The present invention relates to the thermal treatment of cans that have been made by deep drawing from sheets of synthetic plastics, and closed by a welding operation with lids of synthetic plastics after the cans have been filled by the goods to be packaged. By the thermal aftertreatment, the tension produced in the cans which have been filled and closed is removed and, in addition, a sterilization of the goods takes place which cannot be dispensed with in the packaging of foodstuffs. When treating the filled cans, special measures have to be taken since the welded seam connecting the brim of the can with the lid may burst under the action of the pressure of the packaged goods which pressure forms at the temperature of the thermal aftertreatment.

According to the invention, the can which has been filled with goods and shut by welding on a lid prepared from synthetic plastic material and provided with a projecting edge is inserted into a metal muffle, for example, a steel muffle consisting of at least two parts which is designed so that the upper brim of the lower part of the muffle and the underside of the brim of the lid of the muffle seize the whole region of the welded seam of the closed can and clamp it tightly. The other dimensions of the muffle are suitable so as to provide for a tolerance at the button and the top of the can in the direction of its axis. It is particularly suitable for this purpose to design the upper and lower inner surfaces of the muffle in a slightly concave form.

After the can has been inserted into the muffle, the upper and lower parts of the latter are tightly connected with one another by spring pressure, for example, by means of spring clamps, a flange provided with clamping screws or the like. If desired, a special clamping ring prepared from the same material may be inserted between the lower part and the lid of the muffle, the profile of the said ring being such that the region of the welded seam of the cam is pressed tightly and uniformly against the underside of the lid of the muffle.

The metal muffle with the can clamped therein is then subjected for about 10 to 40 and preferably about 20 minutes in an autoclave to an atmosphere of vapor, gas or a liquid bath having a temperature within the range of about 110 to 120° C. By this treatment, dimensional stability of the container is produced and, at the same time, the goods in the can are sterilized. It is, however, also possible to apply temperatures of below 110° C. provided that such temperatures suffice to sterilize the contents of the can or that such a sterilization can be dispensed with. Alternatively, the temperature applied may be above 120° C. provided that such a temperature does not produce any undesired change in the contents of the can.

The muffle may not only be made from steel but may be prepared from any other material having a good thermal conductivity such as aluminum, brass or copper. The thickness of the walls of the muffle is such that the welded seam of the can can be tightly fixed and a sufficient quantity of heat can be transferred to the can enclosed in the muffle. If desired, this may be done by means of perforations in the muffle.

Under the action of the temperature applied according to this invention which is within the range of about 110° C. to 120° C., a certain pressure is produced in the interior of the filled can whereupon its bottom and lid are pressed against the interior surfaces of the muffle. This phenomenon may be used for effecting a further treatment of the exterior surfaces of the can taking placing at the same time as the improvement of its dimensional stability and the sterilization of its contents. For this purpose the interior surfaces of the muffle may be provided with flat negative or positive reliefs, the inverted image of which is obtained in the form of durable relief-like ornaments, inscriptions and the like on the exterior surfaces of the can.

A muffle suitable for use in carrying out the process of this invention is illustrated diagrammatically in the accompanying drawing.

The drawing shows a metal muffle consisting of a lower part 1, a lid 2 and a clamping ring 4. The closed can 3 prepared from synthetic plastic material is inserted into the lower part 1 of the muffle in such a way that the clamping ring 4 surrounding the upper brim of the muffle presses the welded seam of the can tightly against the lid 2 of the muffle which has been put on the lower part of the muffle. For this purpose, the profile of the clamping ring has been narrowed a little in its upper edge and exactly adjusted to that region at the underside of the projecting lid at which can and lid are welded together. The lower part 1 and the lid 2 of the muffle are provided with perforations 5 which produce negative reliefs on the inner sides of the muffle. During the subsequent heat treatment, the negative reliefs produce positive reliefs on the opposing exterior surfaces of the can owing to the pressure of the goods contained in the can.

The inner sides of the muffle shown in the drawing are not concave. It is, however, of advantage to design the muffle in such a way that if the muffle is intended to enclose, for example, a can of a diameter of 74 mm. and a height of 20 mm. a space of about 0.5 to 1.5 cc. is left free at the top and at the bottom.

The following example serves to illustrate the invention but it is not intended to limit it thereto.

Example

In order to prepare a can for packaging, a sheet of polyvinyl chloride was clamped in a deep drawing apparatus and heated. The sheet was deformed in known manner under reduced pressure. The can so obtained was filled with fresh sausage and subsequently shut with a lid by a high-frequency welding operation. The filled and closed can was then put in the muffle described above. The muffle with the can was heated for 20 minutes with steam in an autoclave at a temperature within the range of about 110 to 120° C. The vapor pressure in the autoclave was about 0.8 to 1.5 atmospheres (gage). The muffle which was in a special geometric ratio to the can prevented a deformation of the latter and a bursting of the welded seam. When after the sterilization, the hot muffle was removed from the autoclave a pressure difference with respect to the atmospheric pressure occurred at the places at which the muffle was perforated, owing to the excess pressure prevailing in the can, whereby an embossment in the form of the perforations was produced on the bottom or lid of the can.

Obviously many modifications and variations of the present invention are possible in the light of the above teachings. It is, therefore, to be understood that within the scope of the appended claims the invention may be practiced otherwise than as specifically described.

We claim:

1. A process for the aftertreatment of a rigid deep drawn can of a synthetic thermoplastic material being filled with a sterilizable product and closed by a lid of the same thermoplastic material welded on the can which comprises enclosing said filled and sealed can in a metal muffle in such a manner that the welded seam is clamped over its entire surface between suitably formed surfaces of the muffle, and heating the muffle enclosing the plastic can to the sterilization temperature.

2. A process as claimed in claim 1 wherein the inner surfaces of the metal muffle are provided with flat reliefs which in the course of the heating operation are stamped inversely onto the outer surfaces of the can and the lid.

3. A process as claimed in claim 1, wherein the bottom and lid of the metal muffle have a slightly concave shape.

4. A process for the aftertreatment of a rigid deep drawn can of a synthetic thermoplastic material being filled with a sterilizable product and closed by a lid of the same thermoplastic material welded on the can which comprises enclosing said filled and sealed can in a metal muffle in such a manner that the welded seam is clamped over its entire surface between suitably formed surfaces of the muffle, and heating the muffle enclosing the plastic can to a temperature in the range of 110 to 120° C.

5. A process for the aftertreatment of a rigid deep drawn can of polyvinylchloride being filled with a sterilizable product and closed by a lid of the same thermoplastic material welded on the can which comprises enclosing said filled and sealed can in a metal muffle in such a manner that the welded seam is clamped over its entire surface between suitably formed surfaces of the muffle, and heating the muffle enclosing the plastic can to a temperature in the range of 110 to 120° C.

6. A process for the aftertreatment of a rigid deep drawn can of a synthetic thermoplastic material being filled with a sterilizable product and closed by a lid of the same thermoplastic material welded on the can which comprises enclosing said filled and sealed can in a metal muffle in such a manner that the welded seam is clamped over its entire surface between suitably formed surfaces of the muffle, and heating the muffle enclosing the plastic can during a time in the range of 10–40 minutes, to a temperature in the range of 110 to 120° C.

7. A process for the aftertreatment of a rigid deep drawn can of a synthetic thermoplastic material being filled with a sterilizable product and closed by a lid of the same thermoplastic material welded on the can which comprises enclosing said filled and sealed can in a metal muffle in such a manner that the welded seam is clamped over its entire surface between suitably formed surfaces of the muffle, and heating the muffle enclosing the plastic can to a temperature in the range of 110 to 120° C., said heating being carried out in the atmosphere of a heated gas.

8. A process for the aftertreatment of a rigid deep drawn can of a synthetic thermoplastic material being filled with a sterilizable product and closed by a lid of the same thermoplastic material welded on the can which comprises enclosing said filled and sealed can in a metal muffle in such a manner that the welded seam is clamped over its entire surface between suitably formed surfaces of the muffle, and heating the muffle enclosing the plastic can to a temperature in the range of 110 to 120° C., said heating being carried out in a liquid bath.

9. A process for the aftertreatment of a rigid deep drawn can of polyvinylchloride being filled with a sterilizable product and closed by a lid of the same material welded on the can which comprises enclosing said filled and sealed can in a metal muffle in such a manner that the welded seam is clamped over its entire surface, between suitably formed surfaces of the muffle, and heating the muffle enclosing the polyvinylchloride can during a time in the range between 10 and 40 minutes at a temperature in the range of 110 to 120° C., said heating being carried out in an autoclave by means of steam.

References Cited in the file of this patent

UNITED STATES PATENTS

| | | |
|---|---|---|
| 2,231,791 | Bensel | Feb. 11, 1941 |
| 2,335,978 | Vogt | Dec. 7, 1943 |
| 2,354,916 | Hurt | Aug. 1, 1944 |
| 2,380,134 | Waters | July 10, 1945 |
| 2,531,539 | Smith | Nov. 28, 1950 |